Patented Feb. 7, 1933

1,896,158

UNITED STATES PATENT OFFICE

WILLIAM S. CALCOTT, OF PENNS GROVE, NEW JERSEY, ALBERT S. CARTER, OF WILMINGTON, DELAWARE, AND FREDERICK B. DOWNING, OF CARNEYS POINT, NEW JERSEY, ASSIGNORS TO E. I. DU PONT DE NEMOURS & COMPANY, OF WILMINGTON, DELAWARE, A CORPORATION OF DELAWARE

PROCESS OF PROTECTING ARTICLES FROM CORROSION

No Drawing.   Application filed September 21, 1929.   Serial No. 394,377.

This invention relates to the art of coating compositions and more particularly to a process of protecting articles from corrosion by coating them with a film containing the reaction product of sulfur chloride and a liquid acetylene polymer.

Prior art

It is known that by passing acetylene into a mixture of ammonium chloride, water, cuprous chloride and copper powder, unsaturated hydrocarbons of higher molecular weight are formed and may be separated by distilling them from the catalyst mixture. The water driven over during the distillation process is returned to the catalyst mixture which is then ready for retreatment with acetylene. The major product is a low boiling (80–85° C.) highly unsaturated oil, called divinylacetylene and having most probably the empirical formula $C_6H_6$, but there is also produced at the same time a substantial quantity of other polymerizable polymers of acetylene. Among these may be mentioned a polymer having most probably the empirical formula $C_8H_8$ and, therefore, a tetramer of acetylene, and a polymer believed to have the formula $C_4H_4$. These products may be roughly separated by distillation, and when spread upon a surface exposed to the air yield a dry resistant film.

Further, it has been shown that the mixture obtained as above, or the separated constituents thereof, under the influence of heat or by aging at ordinary temperatures, in the presence of air, further polymerize successively to an oily, then to a gelatinous, then to a resinous mass and finally yield a hard brittle resin having unusual resistance to the action of water and organic solvents. The oily product which is first formed is largely soluble in alcohol and acetone; the gelatinous polymer modification next formed is largely soluble in acetone but partly insoluble in alcohol; the resinous modification next formed is substantially insoluble in alcohol and slightly soluble in acetone, while the subsequent hard, brittle polymers are substantially insoluble in both alcohol and acetone.

It will be understood that these successive polymerization products consist of a mixture of volatile and non-volatile compounds in various stages of polymerization, which compounds may be only roughly separated by dissolving, but may be separated by distillation. When the polymerization is carried only through the inital stages, by heating until an oily liquid is obtained, and the resulting product subjected to distillation to remove the unpolymerized fraction remaining therein, the non-volatile residue has the general properties of a bodied drying oil.

The use of such drying oils as a base for a coating composition is also known. When so employed, as has been shown in a copending application, the flexibility of the synthetic oil may be increased by the addition of rubber softeners and the viscosity may be increased by the addition of synthetic resins, such as meta styrene, or other viscous film-forming material which is compatible with the drying oil. On the other hand, the viscosity may be decreased by dilution with solvents such as xylene, acetone or butyl acetate in the usual manner, or by the addition of small amounts of amines. It has been shown that such compositions dry and harden upon standing to a resinous mass, and when spread on a surface exposed to the air form tough, resistant films. The rate at which the films dry may be increased by the addition of driers such as soluble compounds of lead, cobalt and manganese. Because of the rapid absorption of oxygen by these synthetic drying oils, it has been found advantageous in some cases to add a small amount of an antioxidant, for example, eugenol, in order to reduce the tendency to skin and solidify in the container. The amount of antioxidant may be controlled so that it does not alter the drying rate to an objectionable degree.

However, films made from all of the above described acetylene polymers some times have a tendency to peel due to poor adhesion on surfaces of certain types. Temperature changes also have been known to cause stripping, possibly due to a combination of expansion and insufficient elasticity.

Description of invention

An object of the present invention, therefore, is to improve the films obtained from coating compositions made from any of the above described acetylene polymers and particularly to increase their adhesive properties and elasticity. Another object is the protection of objects exposed to the corrosive action of chemicals.

With these objects in view, a satisfactory method of modifying the above described liquid acetylene polymers, whether obtained directly from acetylene or further polymerized and subjected to distillation as described, has been discovered. It has been found that the product resulting from the action of sulfur chloride on these acetylene polymers produces a material which is softer, more elastic, and more adherent than the acetylene polymers not so treated. This sulfur chloride treated product may be used by itself or it may be used in connection with softeners, resins, solvents and driers as described above in connection with the unreacted synthetic drying oils.

In order to disclose in detail the preparation of the new coating compositions or synthetic drying oils, the following specific examples are furnished by way of illustration. It is to be understood, however, that it is not applicants' intention to be limited to the particular conditions, proportions or reagents recited in the examples.

Example 1

200 parts of an acetylene polymer product prepared from acetylene by passing the same into a mixture of ammonium chloride, water, cuprous chloride and copper powder is heated for 3 hours at 85° and the volatile constituents then distilled off to obtain 50 parts of a drying oil as described hereinabove. The 50 parts of synthetic drying oil are dissolved in an equal volume of toluene and then are treated with 1 part of sulfur chloride while undergoing agitation. When this material is applied to sanded steel strips and allowed to dry in the presence of air, a hard resistant film is obtained. The strip can be bent at a sharp angle without danger of cracking or peeling.

Example 2

To the 50% solution of unreacted synthetic drying oil prepared from acetylene, as described in Example 1, add a quantity of sulfur chloride in the proportion of 1 part by weight to 10 parts by weight of the acetylene polymers, while stirring to obtain a stock solution. When 1 part by weight of this solution is added to 4 parts by weight of the unreacted acetylene polymer drying oil, diluted with an equal weight of toluene, a coating composition of similar properties to that described in Example 1 is obtained.

Example 3

200 parts of a liquid acetylene polymer of high molecular weight, obtained by heating an acetylene polymer comprising divinylacetylene to about 85° for three hours and distilling off the volatile constituents, is treated with 1 part sulfur chloride in 1 part of toluene with stirring. The mixture so formed, containing probably 0.8% of the liquid reaction product is a dark brown viscous liquid which upon drying in air forms a hard dry brittle solid film. This solution may be employed directly as a coating or, if desired, for convenience in application may be diluted with from 15 to 80% of a volatile solvent such as toluene or solvent naphtha.

Example 4

Divinylacetylene is heated for approximately 5 hours at a temperature of approximately 85° C. in the absence of air. The product is diluted with 2 volumes of acetone which causes a precipitate of tacky-rubber-like consistency to separate from the solution. This is separated by decantation and a portion dissolved in benzene, solvent naphtha, or other suitable solvent. The solution is then treated with sulfur chloride in amount equal to about 1% of the weight of dissolved material. The dark viscous liquid is adapted for use as a coating composition.

Example 5

The coating composition as prepared in Example 2 is applied directly to pickled steel and allowed to dry. Two coats of the unreacted acetylene polymer drying oil are then applied. The resulting system when exposed to moist hydrogen chloride for 7 days remained intact. Steel coated with the untreated acetylene polymer and exposed under the same conditions was badly peeled.

An iron pot coated after sand blasting with the system described above was exposed to alternate heating to 120° C. with steam or oil and cooling. After such exposure, the protective film on the pot was found to be unaffected.

The coating system described above was applied to a cement floor. After 4 months of exposure to shock, chemicals and abrasion, the floor was in good condition. Whereas, a floor coated with the untreated acetylene polymer drying oil and exposed to the same conditions had stripped off in one month.

Example 6

Ten parts of unreacted synthetic drying oil prepared from acetylene, as described in Example 1, are mixed with thirty parts of an inert filler such as silica and ten parts of solvent naphtha; the mixture is treated with one part of sulfur chloride while undergoing agitation. This mixture is applied as a base coat on the inside of an iron pot followed by a coat of the synthetic drying oil described hereinabove and untreated with $S_2Cl_2$. After allowing the coating to set and exposing it to the action of steam for 20 hours and thereafter treating the hardened coat with a carbon-tetrachloride solution of bromine the pot is ready for use. The bromination of an organic compound in nitro benzene solution may be carried out at 130° C. in a pot so lined without corrosion by any constituent of the mixture.

Example 7

One part of acetylene polymer, thought to be divinylacetylene, is dissolved in 1 part of toluene and slowly treated with 2 parts of sulfur chloride while the mass is stirred and cooled with ice. The black viscous product so formed is heated to drive off any volatile acid and then may be used as a coating composition directly or in combination with volatile solvents and inert fillers.

It will be understood that the treatment of the acetylene polymer with sulfur chloride is not limited to the specific proportions or methods disclosed in Examples 1 to 7. Any one of the liquid acetylene polymers, whether further polymerized or obtained directly from the acetylene polymerization, may be treated directly with sulfur chloride or they, or the solid soluble polymers as well, may be first dissolved in some unreacted solvent, such as carbon tetrachloride or benzene and thereafter treated with sulfur chloride. Alternatively, the sulfur chloride may be in solution in a solvent for the reaction product and the solution may be added to the acetylene polymer which may or may not be in liquid state so long as it is in soluble form.

To avoid a reaction with explosive violence, the temperature must be controlled during the course of the reaction. The use of a solvent in conjunction with cooling insures ample control. In the absence of a solvent, cooling in ice may become necessary and the addition of sulfur chloride should be slow.

Also, the proportion of sulfur chloride to the untreated acetylene polymer may be varied. A liquid product adapted for use as a coating composition may be obtained by adding as high as 5% of sulfur chloride to a normally liquid polymer in the absence of added solvent. A liquid of similar properties may be prepared by dissolving a soluble solid polymer or a normally liquid polymer in an added solvent for the reaction product and then treating with sulfur chloride. The concentration of the reaction product in such a liquid may obviously be controlled by the concentration of the polymer solution and by the quantity of sulfur chloride added and a solution of the desired properties and viscosity thus obtained for direct use. As high as 2 parts by weight of sulfur chloride for each part of acetylene polymer may be added under these conditions. The degree to which the modification of the original unreacted acetylene polymer is carried is determined by the amount of sulfur chloride added. It appears that the liquid products so obtained are most probably merely solutions of the solid reaction product either in the unreacted liquid polymers or the added solvent depending upon the method of their production.

The ultimate products obtained by saturating the acetylene polymers with sulfur chloride possess essentially the same physical properties irrespective of whether the polymer so treated is the direct product obtained by the polymerization of acetylene or is the further polymerized acetylene polymer.

Application of the coating compositions illustrated in the examples may be made by brush, spray, dipping or any other means adapted to insure a continuous surface. Obviously, as many coatings of the material may be employed as are necessary to suit the specific conditions to which the equipment is to be subjected. Moreover, if desired, the protective coating may be finished by one or more coats of the unpigmented acetylene polymers described above.

The final drying and hardening of the protective coatings may be accomplished in several ways: (1) the coating may be allowed to slowly harden in the presence of air for several days at ordinary temperatures, (2) the hardening may be hastened by steaming or baking after the coating has set, or (3) it may be treated, after it has set to a state in which it will no longer register the impression of a thumb print, with agents which will react with the freshly deposited coat, such as oxygen, bromine, chlorine and others.

Any finely divided inert substance, such as silica, graphite, barytes, etc., may be used as a filler. Inert volatile solvents, such as solvent naphtha, toluene, xylene, etc., may be added as required for fluidity.

Coating compositions consisting of or comprising the sulfur chloride reaction products described above give tough, elastic and adherent films when spread upon surfaces exposed to the air. The coating compositions and resulting films will adhere tenaciously to any surface such as iron, steel, copper, nickel, wood, cement. The dried films show practically no tendency to peel off with change of temperature, steaming or upon exposure to chemicals such as the fumes of hydrogen chloride, bromine, or to acetic acid and corrosive agents in general. Their valuable properties are particularly noteworthy when the resulting films are exposed to agents which tend to strip, crack, or blister and are therefore peculiarly adapted for treating chemical equipment, such as vessels, and interiors of chemical plants which are exposed to the action of corrosive agents.

Vessels treated with the new coating composition will withstand the action of dilute or concentrated hydrochloric acid, hot or cold; hot or cold dilute sulfuric acid; chlorine, bromine, iodine, acetic acid and other organic and inorganic acids, concentrated or in solution, except hot concentrated sulfuric acid and hydrofluoric acid. They are unaffected by carbon disulfide, carbon tetrachloride, nitrobenzene, aniline sulfate, phenol, benzene, chlorbenzene, toluene and other organic compounds. They will not withstand the corrosive action, however, of fused caustic. A hardened film of the new composition has been found to give protection against the corrosive action resulting from the phenylation of amino epsilon acid in aniline sulfate at 120°; in the chlorination of anthraquinone sulfonic acid in which vitreous enamel has been found to fail; in the bromination of organic compounds in nitrobenzene at 130°; in the reduction of compounds with metals in hydrochloric acid; and other chemical reactions of a corrosive nature.

Moreover, the process of applying the new coating composition is less expensive and more readily carried out than the application of the materials heretofore employed for similar purposes. The protective coat may be employed after the equipment is installed as well as before the installation which is not the case with vitreous enamel. Furthermore, linings of vitreous enamel cannot be repaired when damaged whereas the coating which is the subject of the present invention may be replaced in part or in its entirety as the need may arise.

As many apparent and widely different embodiments of this invention may be made without departing from the spirit thereof, it is to be understood that we do not limit ourselves to the foregoing examples or description except as indicated in the following claims:

We claim:

1. The improvement in the art of protecting chemical equipment from the action of corrosive reagents which comprises applying thereto a film of a composition containing the reaction product of sulfur chloride with a liquid non-volatile polymerized nonbenzenoid acetylene polymer, said composition also containing a volatile solvent, allowing said film to set in the presence of air and thereafter treating it with an oxidizing agent of the class consisting of steam, oxygen, bromine and chlorine.

2. The process of protecting chemical equipment from corrosion which comprises applying thereto a film of a liquid containing a reaction product of not over 2 parts of sulfur chloride to substantially 1 part of a nonbenzenoid acetylene polymer, together with a volatile solvent, allowing said film to set in the presence of air and thereafter treating it with an oxidizing agent of the class consisting of steam, oxygen, bromine and chlorine.

3. A process of protecting chemical equipment from corrosion which comprises applying thereto a film of a liquid resulting from reacting a solution in an inert volatile solvent of a normally liquid non-volatile nonbenzenoid acetylene polymer with about 10% of sulfur chloride (based on the weight of the polymer), allowing said coating to harden, and superimposing thereon a film having as its base a liquid non-volatile polymerized acetylene polymer and thereafter exposing said film to oxidizing conditions.

4. The process of claim 3 in which the final coat is allowed to set in the presence of air, thereafter steamed for 10 hours and finally treated with a solution of a bromine.

5. Chemical equipment provided with a coating resulting from applying thereto as a first coat a film of a composition comprising a liquid obtained by reacting 10 parts of a normally liquid non-volatile polymerized nonbenzenoid acetylene polymer with about 1 part of sulfur chloride, said composition also containing about 10 parts of a volatile selvent and 30 parts of an inert filler, allowing said film to harden, superimposing thereon a film of a liquid containing a non-volatile polymerized acetylene polymer and thereafter exposing said latter film to oxidizing conditions.

6. An article of manufacture, comprising a corrodible metal article having thereon a protective coating, comprising the oxidized reaction product of sulfur chloride and a nonbenzenoid acetylene polymer.

7. An article of manufacture, comprising a a corrodible metal article having thereon a protective coating, obtained by applying to a surface of the said metal a liquid composition comprising the reaction product of sulfur chloride and a nonbenzenoid acetylene polymer, allowing the film to harden and thereafter treating it with an oxidizing agent of the class consisting of steam, oxygen, bromine and chlorine.

8. A hard resinous composition of matter comprising the oxidized reaction product of sulfur chloride and a normally liquid non-volatile nonbenzenoid acetylene polymer.

9. A container for corrosive chemicals provided with a protective coating comprising the oxidized reaction product of sulfur chloride and a polymerized nonbenzenoid acetylene polymer.

10. Chemical equipment provided with a hard resinous coating comprising the oxidized reaction product of one part of a nonbenzenoid acetylene polymer with not over two parts of sulfur chloride.

11. A vessel for chemical reactions provided with a hard resinous coating comprising the oxidized reaction product of 10 parts of a normally liquid non-volatile polymerized nonbenzenoid acetylene polymer with about one part of sulfur chloride.

In testimony whereof we affix our signatures.

WILLIAM S. CALCOTT.
ALBERT S. CARTER.
FREDERICK B. DOWNING.